US011479176B2

(12) United States Patent
Barras et al.

(10) Patent No.: US 11,479,176 B2
(45) Date of Patent: Oct. 25, 2022

(54) MOUNTING ASSEMBLY OF A VEHICLE INTERIOR MIRROR OR OTHER PANE ADD-ON PART

(71) Applicant: SAINT-GOBAIN GLASS FRANCE, Courbevoie (FR)

(72) Inventors: Claire Barras, Herzogenrath (DE); Martin Lakshmanan, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 143 days.

(21) Appl. No.: 16/978,977

(22) PCT Filed: Jun. 17, 2019

(86) PCT No.: PCT/EP2019/065817
§ 371 (c)(1),
(2) Date: Sep. 8, 2020

(87) PCT Pub. No.: WO2020/007595
PCT Pub. Date: Jan. 9, 2020

(65) Prior Publication Data
US 2021/0362652 A1    Nov. 25, 2021

(30) Foreign Application Priority Data
Jul. 5, 2018   (EP) .................................... 18181947

(51) Int. Cl.
*B60R 1/04*    (2006.01)
*B60R 11/00*    (2006.01)

(52) U.S. Cl.
CPC ......... *B60R 1/04* (2013.01); *B60R 2011/0033* (2013.01); *B60R 2011/0063* (2013.01)

(58) Field of Classification Search
CPC ............... B60R 1/04; B60R 2011/0033; B60R 2011/0063; A47G 1/17; F16B 47/003
(Continued)

(56) References Cited

U.S. PATENT DOCUMENTS 3,130,103 A * 4/1964 Mattimoe ................. B60R 1/04
156/391
3,131,251 A * 4/1964 Ryan ........................ B60R 1/04
248/467
(Continued)

FOREIGN PATENT DOCUMENTS

DE    91 12 912 U1   12/1991
FR    1 580 557 A    9/1969
(Continued)

OTHER PUBLICATIONS

International Search Report as issued in International Patent Application No. PCT/EP2019/065817, dated Aug. 12, 2019.

*Primary Examiner* — Ricky D Shafer
(74) *Attorney, Agent, or Firm* — Pillsbury Winthrop Shaw Pittman LLP

(57) ABSTRACT

A mounting assembly of a vehicle interior mirror or other pane add-on part, includes a pane adhesive element, shaped in a substantially plate-shaped or disc-shaped manner and having a free first surface designed as an adhesive surface for fastening the mounting assembly to the inner-side of a vehicle pane and a second surface and a mirror mount, having a first end face, on which the pane adhesive element is seated with the second surface thereof, and a second end face designed for mounting a housing of the vehicle interior mirror or add-on part, wherein the pane adhesive element has the shape of a flat truncated cone or a flat pyramid such that the second surface is smaller than the free first surface.

20 Claims, 4 Drawing Sheets

Figures 1A, 1B:
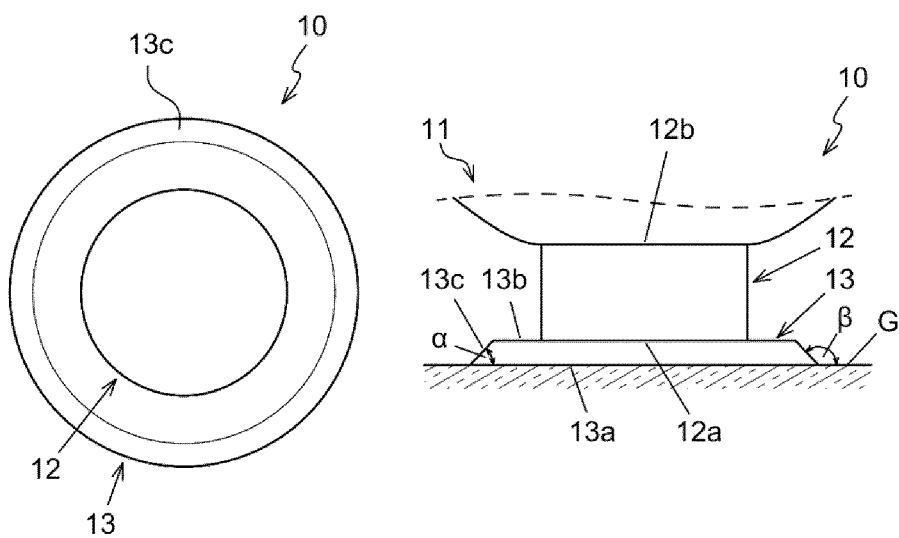

(58) Field of Classification Search
USPC .................................. 359/871, 872; 248/467
See application file for complete search history.

(56) References Cited

U.S. PATENT DOCUMENTS

| | | | | |
|---|---|---|---|---|
| 4,593,878 A | * | 6/1986 | Stewart | B60R 1/04 |
| | | | | 248/467 |
| 5,330,149 A | * | 7/1994 | Haan | B60R 1/04 |
| | | | | 248/549 |
| 5,587,236 A | * | 12/1996 | Agrawal | B32B 17/10036 |
| | | | | 248/467 |
| 5,820,097 A | * | 10/1998 | Spooner | B60R 1/04 |
| | | | | 248/549 |
| 6,042,076 A | * | 3/2000 | Moreno | B60R 1/04 |
| | | | | 248/467 |
| 6,202,976 B1 | * | 3/2001 | Johnson | B60R 1/04 |
| | | | | 248/478 |
| 2004/0079853 A1 | * | 4/2004 | Suzuki | B60R 1/04 |
| | | | | 248/467 |
| 2006/0061008 A1 | | 3/2006 | Karner et al. | |
| 2018/0147999 A1 | * | 5/2018 | Zurowski | H04N 5/2253 |

FOREIGN PATENT DOCUMENTS

| | | |
|---|---|---|
| FR | 2 093 340 A5 | 1/1972 |
| FR | 2 318 044 A1 | 2/1977 |
| FR | 2 354 218 A1 | 1/1978 |
| GB | 172 543 A | 12/1921 |
| GB | 860 418 A | 2/1961 |
| GB | 1 387 591 A | 3/1975 |
| GB | 1546568 A | 5/1979 |
| JP | S45-008372 B | 3/1970 |
| JP | S48-051447 A | 7/1973 |
| JP | S49-085741 U | 7/1974 |

\* cited by examiner

MOUNTING ASSEMBLY OF A VEHICLE INTERIOR MIRROR OR OTHER PANE ADD-ON PART

CROSS-REFERENCE TO RELATED APPLICATIONS

This application is the U.S. National Stage of PCT/EP2019/065817, filed Jun. 17, 2019, which in turn claims priority to European patent application no. 18181947.5 filed Jul. 5, 2018. The content of these applications are incorporated herein by reference in their entireties.

The invention relates to a mounting assembly of a vehicle interior mirror or other pane add-on part. Mounting assemblies are widely used for fastening the interior rearview mirror in the central upper region of the windshield of passenger cars, but also for mounting external navigation devices or possibly also mobile phones or other mobile devices on the windshield or another pane of a land, water, or air vehicle. Although the focus of the use of such mounting assemblies is in passenger car production or additional equipment, it is no way limited to this.

There are a large number of different designs of mounting assemblies of the type mentioned, and common to all of them is the fact that a durable attachment to the pane must be ensured. It is known, for this purpose, to provide a pane adhesive element that forms, as it were, the interface between the vehicle pane and the actual mirror mount, i.e., is connected to the mirror mount at one surface and has a free surface for connecting to the vehicle pane. Mounting assemblies that have such a pane adhesive element are described, for example, in US 2006/0061008 A1.

The pane adhesive elements described there and other known pane adhesive elements are disc-shaped or plate shaped, i.e., their peripheral surface runs at right angles to the free surface.

Known from FR 1 580 557 is an interior rearview mirror for vehicles, in particular for motor vehicles, whose mount is attached to the windshield by gluing. The mount is bonded to the windshield by means of a double-sided adhesive film. The mirror is attached to an arm by means of a hinge and the arm is fastened on the mount by a screw.

The object of the invention is to provide a mounting assembly of the generic type having improved functionality that ensures, in particular, improved adhesion to the vehicle pane that is reliable even under harsh conditions of use. In particular, an improved design should take into account the fact that increasingly lighter panes, inevitably having reduced mechanical stability, are being used in vehicle construction, and, consequently, are susceptible to localized mechanical stresses, as can occur during handling of a mirror or similar add-on parts, such as displays, mounted on the pane.

This object is accomplished by a mounting assembly with the features as described hereinafter. Expedient further developments of the inventive concept constitute the subject matter of the dependent claims.

According to the invention, the pane adhesive element has the shape of a flat truncated cone or flat pyramid such that the second surface is smaller than the free first surface. As a result, the peripheral edge of the pane adhesive element forms an acute angle with the free surface used for mounting on the pane or, in the mounted state, forms an obtuse angle with the pane. According to the findings of the inventors, this obtuse angle is advantageous in that it significantly reduces the tension concentrations at the peripheral edge of the adhesive element when the mirror is subjected to a load.

In the context of the invention, the term "vehicle interior mirrors" also means other vehicle add-on parts, such as displays, navigation devices, or smart phone holders.

In one embodiment, the pane adhesive element has the shape of a straight circular truncated cone. Correspondingly, in the case of a rectangular or square base, the pane adhesive element has the shape of a pyramid with a rectangular, in particular square, base. Also conceivable are embodiments in which the pane adhesive element has the shape of a oblique circular truncated cone or of a truncated cone with an elliptical base or even of an oblique pyramid or of a pyramid with a polygonal base. The advantages achieved with the invention are also inherent to such embodiments; however, in practice, they are likely to play a lesser role.

Usually, in the implementation of the invention, the second surface of the pane adhesive element will be parallel to the free first surface. However, in principle, the invention can also be used with mounting assemblies with which the pane adhesive element has primary surfaces inclined relative to one another to meet specific requirements.

According to the findings of the inventors, it is expedient for the cone angle of the truncated cone or the pyramid angle of the pyramid to be between 5° and 45°, in particular between 10° and 30°. This yields an obtuse angle between the peripheral edge of the pane adhesive element and the pane surface in the range between 135° and 175°, in particular between 150° and 170°, which ensures sufficient distribution of tension at the attachment site of the mirror or add-on part.

In another embodiment, provision is made for the pane adhesive element to be made of a compressible and/or flexible material such that, in the mounted state, the free first surface deforms in adaptation to a curved adjacent pane surface, while the second surface does not deform or deforms only slightly. This embodiment is, in particular, advantageous when the pane adhesive element has a very small cone angle or pyramid angle and its contact surface with the pane thus becomes relatively large. Since modern vehicle panes, in particular windshields, are often curved over large areas, a correspondingly compressive or flexible pane adhesive element adapts better to the contour of the pane surface than a rigid element.

In currently preferred embodiments, the free first and/or the second surface of the pane adhesive element is coated with adhesive. In principle, a different type of adhesive can also be used for the first free surface, e.g., for special cases in which removability of the mirror or other add-on part (e.g., displays, navigation devices, or smart phone holders) is desired.

Another embodiment of the invention can provide for the first end face of the mirror mount to be at least 25% larger than the adjacent second surface of the pane adhesive element. In order to prevent the free surface (base area) of the pane adhesive element from becoming excessively large, especially when a small cone or pyramid angle is established, the pane adhesive element can be made smaller overall. Thus, its second surface which contacts the mirror mount is, of course, also made smaller, and it can be advisable not to reduce the size of the mirror mount, but, instead, to allow the adjacent end face of the mirror mount to protrude significantly beyond the pane adhesive element. This does not represent a disadvantage if a sufficiently stable connection means is selected for connecting the pane adhesive element and the mirror mount.

In another embodiment, provision is correspondingly made for the second surface of the pane adhesive element and the adjacent first end face of the mirror mount to be provided with mutually corresponding connection means for the positive connection of the mirror mount to the pane adhesive element. In addition to the usual advantages of a positive connection, this embodiment also offers the capability of removing the mirror mount or the mount of the add-on part (and thus the mirror or the add-on part) without having to destroy the connection between the pane and the pane adhesive element. The connection can be additionally secured by latching means or locking means known per se.

In other embodiments, the mirror mount is implemented in multiple parts; and it includes a mirror foot part, which has the first end face connected to the mirror adhesive element, and a cantilever part connected to the mirror foot part, in particular movably, which has the second end face designed for mounting the mirror housing.

In addition to the advantage of being able to adjust or align the mirror or the add-on part as desired, such an embodiment also offers the capability of providing means at the interface between the mirror foot part and the cantilever part that partially absorb forces acting on the mirror or the add-on part and do not transfer them completely to the pane adhesive element. The advantages achieved by its shape according to the invention can thus be reinforced by such an embodiment of the mirror mount.

Figures 2A, 2B:
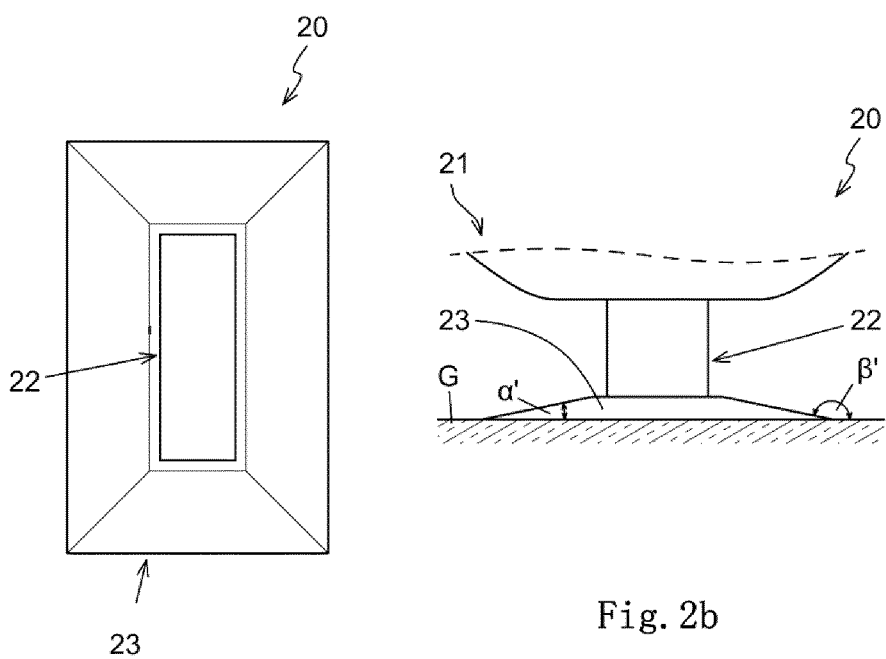
Figure 3:
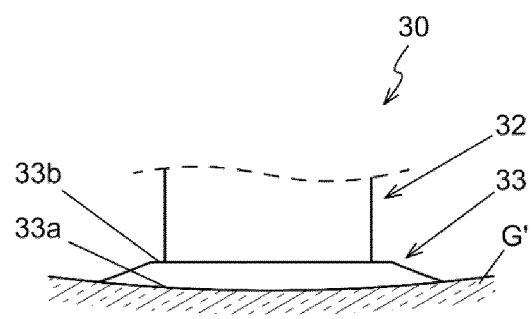
Figure 4:
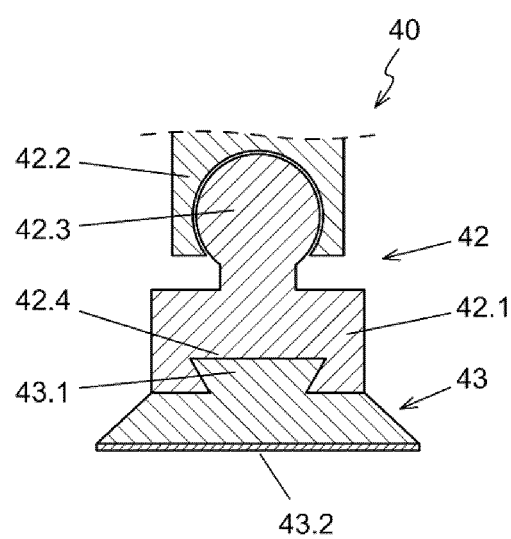

Advantages and functionalities of the invention are also apparent from the following description of exemplary embodiments with reference to the figures. They depict:

FIGS. 1a and 1b sketch-like representations of a first embodiment of the invention, FIGS. 2a and 2b sketch-like representations of a second embodiment of the invention, FIG. 3 a sketch-like representation for explaining an embodiment of the invention, and FIG. 4 a schematic representation of a mounting assembly according to another embodiment of the invention.

FIGS. 1a and 1b depict, in the manner of a plan view and a side view, a first exemplary mounting assembly 10 of a vehicle interior mirror, of which a section of a mirror housing 11 is depicted in FIG. 1b. The mounting assembly 10 includes a mirror mount 12 shown schematically here as a cylinder and a pane adhesive element 13 having the form of a flat, straight circular truncated cone.

The pane adhesive element 13 has a larger first surface 13a, with which it is attached to a glass pane G in the mounted state depicted in FIG. 1b, and a smaller second surface 13b, with which it is connected to the mirror mount 12. Due to the truncated cone shape of the pane adhesive element, its peripheral surface 13c runs inclined relative to both (primary) surfaces 13a, 13b, namely at a cone angle α. In the embodiment shown, this angle is approx. 45°. Accordingly, an angle β, which the peripheral surface 13c forms with the surface of the pane G, is an obtuse angle and, in the example depicted, is approx. 135°.

The mirror mount 12 has a first end face 12a, on which the pane adhesive element 13 sits with its second surface 13b, and a second end face 12b, which is connected to the mirror housing 11. The connections of the mirror mount 12 to the pane adhesive element 13 on the one hand and to the mirror housing 13 on the other can be implemented as adhesive connections.

FIGS. 2a and 2b depict another exemplary mounting assembly 20. The basic structure corresponds to that of the mounting assembly 10 of FIGS. 1a and 1b and is, consequently, not described again in detail here. Similar or functionally corresponding components are identified by reference numbers based on FIGS. 1a and 1b.

A first essential difference from the embodiment described above consists in that the mirror mount 22 is rectangular and the pane adhesive element 23 has the shape of a flat pyramid with a rectangular base. A second difference consists in that the pyramid angle α' here is substantially smaller than the cone angle α of the pane adhesive element 13 of FIGS. 1a and 1b and is approx. 10°. Accordingly, the angle β', which the strongly inclined edge surface or peripheral surface of the pane adhesive element 23 forms with the glass pane G, is significantly larger and is approx. 170°.

FIG. 3 schematically depicts a mounting assembly 30, which, in turn, has a mirror mount 32 and a pane adhesive element 33, mounted on a curved glass pane G'. Selecting a material that is both compressible and flexible for the pane adhesive element 33 results in the fact that its free surface 33a connected to the glass pane G' conforms perfectly to the curvature of the glass pane and thus ensures optimum adhesion, while the second surface 33b connected to the mirror mount 32 can remain flat without tension and thus a reliable connection to the mirror mount is ensured, on the other hand. Such properties of the pane adhesive element 33 can be achieved with suitable plastic materials, such as PU materials, which are known to the person skilled in the art and commercially available.

FIG. 4 depicts, in the form of a cross-sectional representation, another mounting assembly 40, whose mirror mount 42 is of multi-part design and includes a mirror foot part 42.1 and a cantilever part 42.2. The two parts are pivotably connected to one another by a friction-damped ball joint 42.3.

The mirror mount 42 and the pane adhesive element 43 are positively connected to one another by a dovetail connection 42.4/43.1. In addition, latching means (not shown) for locking the two parts together or an adhesive connection (likewise, not shown) can be provided. The free surface of the adhesive element 43 is provided with an adhesive layer 43.2 for attachment to a glass pane or other mounting surface.

The implementation of the invention is not limited to the above-described examples and highlighted aspects, but is also possible in many variations that fall within the scope of the attached claims.

LIST OF REFERENCE CHARACTERS

10; 20; 30; 40 mounting assembly
11, 21 mirror housing
12, 22, 32, 42 mirror mount
12a first end face of the mirror mount
12b second end face of the mirror mount
13; 23; 33; 43 pane adhesive element
13a; 33a free first surface of the pane adhesive element
13b; 33b second surface of the pane adhesive element
13c inclined peripheral surface of the pane adhesive element
42.1 mirror foot part
42.2 cantilever part
42.3 ball joint
42.4, 43.1 dovetail connection
43.2 adhesive layer
G; G' glass pane
α; α' cone angle or pyramid angle
β; β' angle between the peripheral surface and the glass surface

The invention claimed is:

1. A mounting assembly of a vehicle interior mirror, which comprises:
    a pane adhesive element shaped in a substantially plate-shaped or disc-shaped manner and having a free first surface configured as an adhesive surface for fastening the mounting assembly to an inner-side of a vehicle pane, and a second surface and a mirror mount having a first end face on which the pane adhesive element is seated with the second surface thereof, and a second end face configured for mounting a housing of the vehicle interior mirror,
    wherein
    the pane adhesive element has the shape of a flat truncated cone or a flat pyramid such that the second surface is smaller than the free first surface,
    wherein the pane adhesive element consists of a compressible material or flexible material, or both a compressible and flexible material, such that, in the mounted state, the free first surface deforms in adaptation to a curved adjacent pane surface, while the second surface does not deform or deforms only slightly.

2. The mounting assembly according to claim 1, wherein the pane adhesive element has the shape of a straight circular truncated cone.

3. The mounting assembly according to claim 1, wherein the pane adhesive element has the shape of a pyramid with a rectangular base.

4. The mounting assembly according to claim 3, wherein the pyramid has a square base.

5. The mounting assembly according to claim 1, wherein the second surface of the pane adhesive element is parallel to the free first surface.

6. The mounting assembly according to claim 1, wherein the cone angle of the truncated cone or pyramid angle of the pyramid is between 5° and 45°.

7. The mounting assembly according to claim 6, wherein the cone angle of the truncated cone or pyramid angle of the pyramid is between 10° and 30°.

8. The mounting assembly according to claim 1, wherein the free first surface or the second surface, or both the free first surface and the second surface, of the pane adhesive element is coated with adhesive.

9. The mounting assembly according to claim 1, wherein the first end face of the mirror mount is at least 25% larger than the adjacent second surface of the pane adhesive element.

10. The mounting assembly according to claim 1, wherein the second surface of the pane adhesive element and the adjacent first end face of the mirror mount are provided with mutually corresponding connection means for a positive connection of the mirror mount to the pane adhesive element.

11. The mounting assembly according to claim 1, wherein the mirror mount is of multi-part design and includes a mirror foot part, which has the first end face connected to the mirror adhesive element, and a cantilever part connected to the mirror foot part, which has the second end face configured for mounting the mirror housing.

12. The mounting assembly according to claim 11, wherein the cantilever part is movably connected to the mirror foot part.

13. A glass pane comprising:
    a mounting assembly of a vehicle interior mirror, the mounting assembly including
        a pane adhesive element shaped in a substantially plate-shaped or disc-shaped manner and having a free first surface configured as an adhesive surface for fastening the mounting assembly to an inner-side of a vehicle pane, and a second surface and a mirror mount having a first end face on which the pane adhesive element is seated with the second surface thereof, and a second end face configured for mounting a housing of the vehicle interior mirror,
        wherein
        the pane adhesive element has the shape of a flat truncated cone or a flat pyramid such that the second surface is smaller than the free first surface,
        wherein the pane adhesive element consists of a compressible material or flexible material, or both a compressible and flexible material, such that, in the mounted state, the free first surface deforms in adaptation to a curved adjacent pane surface, while the second surface does not deform or deforms only slightly.

14. The glass pane according to claim 13, wherein the pane adhesive element has the shape of a straight circular truncated cone.

15. The glass pane according to claim 13, wherein the pane adhesive element has the shape of a pyramid with a rectangular base.

16. The glass pane according to claim 13, wherein the second surface of the pane adhesive element is parallel to the free first surface.

17. The glass pane according to claim 13, wherein the cone angle of the truncated cone or pyramid angle of the pyramid is between 5° and 45°.

18. The glass pane according to claim 13, wherein the free first surface or the second surface, or both the free first surface and the second surface, of the pane adhesive element is coated with adhesive.

19. The glass pane according to claim 13, wherein the first end face of the mirror mount is at least 25% larger than the adjacent second surface of the pane adhesive element.

20. The glass pane according to claim 13, wherein the second surface of the pane adhesive element and the adjacent first end face of the mirror mount are provided with mutually corresponding connection means for a positive connection of the mirror mount to the pane adhesive element.

* * * * *